US009929384B2

(12) United States Patent
Le-Gall et al.

(10) Patent No.: US 9,929,384 B2
(45) Date of Patent: Mar. 27, 2018

(54) ENERGY STORAGE MODULE CONTAINING A PLURALITY OF ENERGY STORAGE ELEMENTS AND IMPROVED MEANS OF THERMAL DISSIPATION AND METHOD OF ASSEMBLY (71) Applicant: BLUE SOLUTIONS, Ergue Gaberic (FR)

(72) Inventors: Laurent Le-Gall, Ergue-Gaberic (FR); Anne-Claire Juventin, Quimper (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 24 days.

(21) Appl. No.: 14/397,850

(22) PCT Filed: Apr. 5, 2013

(86) PCT No.: PCT/EP2013/057265
§ 371 (c)(1),
(2) Date: Oct. 29, 2014

(87) PCT Pub. No.: WO2013/164157
PCT Pub. Date: Nov. 7, 2013

(65) Prior Publication Data
US 2015/0125730 A1    May 7, 2015

(30) Foreign Application Priority Data

Apr. 30, 2012   (FR) ...................... 12 53980

(51) Int. Cl.
*H01M 2/10*     (2006.01)
*H01M 10/653*   (2014.01)
(Continued)

(52) U.S. Cl.
CPC .......... *H01M 2/1016* (2013.01); *H01G 11/08* (2013.01); *H01G 11/14* (2013.01);
(Continued)

(58) Field of Classification Search
CPC ..... H01G 11/08; H01G 11/82; H01M 10/653; H01M 2/10; H01M 2/1022; H01M 2/1077;
(Continued)

(56) References Cited

U.S. PATENT DOCUMENTS 6,162,559 A * 12/2000 Vutetakis ............ H01M 2/1077
429/100
2006/0286441 A1* 12/2006 Matsuoka ............. H01M 2/105
429/99
(Continued)

FOREIGN PATENT DOCUMENTS

DE    10 2007 063 186 A1    6/2009
DE    10 2008 034 862 A1    1/2010
(Continued)

OTHER PUBLICATIONS

DE 102007063186 MT.*
(Continued)

*Primary Examiner* — Alex Usyatinsky
(74) *Attorney, Agent, or Firm* — Womble Bond Dickinson (US) LLP (57) ABSTRACT The present invention relates to an energy storage module (10) able to contain a plurality of energy storage elements (14), the module comprising an envelope (16) comprising at least one plurality of lateral walls and two end walls (18A, 18B) dimensioned so as to surround the energy storage elements, at least one member for placing in contact (22) made at least partially from a thermally conducting material, intended to be placed between at least one energy storage element and a lateral wall of the module, termed the reference wall (20A), said member comprising a first contact face (24A) and a second contact face (30A) which are associated respectively with the reference wall (20A) and said energy storage element or elements (14), one at least of said first
(Continued)

(24A) and second (30A) contact faces being adapted to abut against one of the reference wall (20A) or of said element or elements (14), and said member being configured so that the distance between the first and second contact faces can vary. The invention also relates to a method of assembling a module.

18 Claims, 7 Drawing Sheets

(51) Int. Cl.
| | |
|---|---|
| *H01M 10/643* | (2014.01) |
| *H01M 10/6554* | (2014.01) |
| *H01M 10/613* | (2014.01) |
| *H01G 11/08* | (2013.01) |
| *H01G 11/82* | (2013.01) |
| *H01G 11/14* | (2013.01) |
| *H01M 10/6551* | (2014.01) |

(52) U.S. Cl.
CPC ............ *H01G 11/82* (2013.01); *H01M 2/105* (2013.01); *H01M 2/1022* (2013.01); *H01M 2/1072* (2013.01); *H01M 2/1077* (2013.01); *H01M 10/613* (2015.04); *H01M 10/643* (2015.04); *H01M 10/653* (2015.04); *H01M 10/6554* (2015.04); *H01M 10/6551* (2015.04); *Y10T 29/49002* (2015.01); *Y10T 29/49108* (2015.01)

(58) Field of Classification Search
CPC ........... H01M 10/643; H01M 10/6554; H01M 10/613; H01M 2/1016; H01M 2/1072; H01M 2/105
See application file for complete search history.

(56) References Cited

U.S. PATENT DOCUMENTS

2011/0183177 A1 7/2011 Sohn
2012/0148877 A1* 6/2012 Kalman ................ H01M 2/105
429/7

FOREIGN PATENT DOCUMENTS

EP 0 989 618 A1 3/2000
EP 2099085 * 9/2009

OTHER PUBLICATIONS

Decision to Grant a Patent for Application # JP 2015-509349 (Japanese counterpart of the instant Application) dated May 18, 2017.*
Office Action in U.S. Appl. No. 14/397,849 dated Feb. 1, 2017. 17 pages.

* cited by examiner

ENERGY STORAGE MODULE CONTAINING A PLURALITY OF ENERGY STORAGE ELEMENTS AND IMPROVED MEANS OF THERMAL DISSIPATION AND METHOD OF ASSEMBLY

The subject of the present invention is an electric power storage module comprising a plurality of power storage elements.

Such power storage elements can comprise a condenser, a battery, a supercapacitor, etc. Each of these elements generally comprises an electrochemical core storing power and comprising at least one positive electrode and one negative electrode, and a rigid external casing mechanically protecting the electrochemical core. The electrochemical core is connected to the casing such that a positive terminal and a negative terminal of the storage element are accessible from the exterior of the latter.

A module is an assembly comprising a plurality of power storage elements arranged side by side and connected electrically, generally in series. It provides power storage element assemblies in a single block supporting higher voltage and providing greater storage capacity than unitary elements. In addition to containing the storage elements, it generally comprises many functional elements (electric insulation, thermal conduction, balancing of the load of the storage elements, etc.) which ensure proper operation of the module.

A power storage module comprising a plurality of power storage elements arranged side by side is already known in the prior art. This module comprising an external parallelepiped envelope comprising six independent walls fixed to each other during assembly of the module. It also comprises a thermal conduction mat on which the storage elements are placed, such a mat conducting heat from the elements to the exterior of the module. One of the walls, especially the lower wall of the module, can also comprise cooling fins for better discharge of heat to the exterior of the module.

Such a module is satisfactory for the majority of applications. However, for some applications the aim is always to boost the volume capacity of the module. Now, the increase of the volume capacity causes an increase in heat produced, and can cause poor discharge of heat or, to rectify this disadvantage, an increase in volume for the purposes of discharge of heat which does not significantly increase the volume capacity of the module.

To rectify the above disadvantages, the aim of the invention is a power storage module capable of containing a plurality of power storage elements, the module comprising:
- an envelope comprising at least a plurality of lateral walls and two end walls, the lateral walls being made in a single piece having a closed outline and sized to enclose the power storage elements,
- at least one contacting member made at least partially of thermally conductive material intended to be placed between at least one power storage element and a lateral wall of the module, called reference wall, said member comprising a first contact face and a second contact face associated respectively to the reference wall and said power storage element(s), one at least of said first and second contact faces being adapted to abut against one of the reference wall or said element(s), and said member being configured such that the distance between the first and second contact faces can vary.

"Which abuts against" means that the storage element or the reference wall holds the member in its position, and are likely to determine the entire distance between the first and second contact faces.

The member can for example be in direct contact with the element and/or the reference wall. A non-rigid piece (such as a mat or insulating foil) can also be inserted between the contacting member and the reference wall or the storage element. It is not considered that the assembly is abutted against such a non-rigid piece, as the latter is unlikely to influence only the position of one or the other of the contact faces and/or the distance between the two contact faces.

The above characteristic according to which "one at least of said first and second contact faces is adapted to abut against one of the reference walls or said element(s) and said member is configured such that the distance between the first and second contact faces can vary" can also be expressed in the following form: "said member comprises a first contact face, a second contact face and at least one elastically deformable component between the first contact face and the second contact face, the reference wall and said element(s) being adapted to stress respectively the first face and the second contact face such that the distance between the first contact face and the second contact face varies by deformation of the elastically deformable component".

In this way, because of the invention heat can be evacuated via several channels towards the envelope of the module, specifically not only conventionally (wall against which the elements are pressed, especially the lower wall of the module) but also by means of the member and of the reference wall of the envelope.

The fact that the distance between the first and the second wall of the contacting member is variable ensures that the elements are pressed against the reference wall in all the modules, irrespective the manufacturing tolerances of the different pieces of the module, especially of the envelope.

The heat evacuated at the level of the envelope can therefore be boosted by way of the contacting member without adding fins to the latter. It is seen nevertheless that the invention does not exclude protection of a module such as defined hereinabove and whereof the envelope is fitted with fins. These fins are not simply necessary because of the configuration of the envelope.

In a particularly preferred embodiment, the lateral walls of the envelope are made in a single piece having a closed outline and being sized to enclose the power storage elements The envelope comprising several walls in a single piece in fact allows better circulation of heat within the envelope than in the prior art since there is no discontinuity of material between two adjacent walls. The heat is better distributed between the different parts of the envelope and the exchange surface of the envelope with the air is bigger.

The contacting member, variable of height, easily slides the elements in the envelope by minimising the height of the member, and presses these elements against a wall of the envelope to also allow proper discharge of the heat from the elements towards the envelope of the module (by increasing the height of the member once the elements are inserted into the module).

In fact, during insertion of the elements into the envelope, the contacting member is configured such that its height is less than the height between the elements and the lateral wall, and there is still no close contact of the elements with the walls of the envelope. The elements can therefore easily be inserted and placed in the best way in the piece. Next, the height between the contact faces of the member is varied so as to press the elements against the wall of the envelope capable of dissipating heat and the reference wall by means of the member, to optimise this discharge.

According to preferred variants of the invention, the above variation in height of the contacting member is done automatically, during insertion in the envelope, when an element for controlling variation in this height comes into contact with a wall of the envelope.

It is also evident that the module according to the invention has other advantages, especially:

the heat discharge wall (that against which the elements are pressed, optionally by means of a thermal mat) no longer has to be the lower wall of the module, a wall against which the elements were in close contact because of gravity (since the elements can easily be pressed against any wall of the module without the assembly method of the module being complex). In this way, there is more flexibility in the choice heat of discharge wall, and the most adapted wall can be selected as a function of the members enclosing the module (for example, the wall closest to a cooling element or further away from another member releasing heat), having an already partially formed envelope (several walls made in a single piece) simplifies the assembly method of the module, avoiding relative complex positioning of the walls relative to each other. In addition, the fact that the envelope comprises fewer pieces than in the prior art obviates many problems, such as problems of tightness between the different pieces of the envelope. The assembly method of the module can therefore be simplified and costs associated with manufacture of the latter can be lowered The invention will now be described in reference to the appended figures, showing a non-limiting embodiment of the invention, in which:

As indicated earlier, the module 10; 100 according to the invention is capable of containing a plurality of power storage elements 14; 114, and comprises:

an envelope 16; 116 comprising at least a plurality of lateral walls and two end walls 18A; 18B, and sized to enclose the power storage elements, at least one contacting member 22; 80; 122 intended to be inserted between at least one power storage element and a lateral wall of the module, called reference wall 20A; 120A, said member comprising a first contact face 24A; 86A; 126A which abuts against the reference wall 20A; 120A and a second contact face 30A; 84A; 124A which abuts against said element(s) 14; 114, and being configured such that the distance between the first and second contact faces can vary.

The module according to the invention can also comprise the one or more characteristics of the list hereinbelow:

the lateral walls of the envelope are made in a single piece 20; 120 having a closed outline and being sized to enclose the power storage elements, the piece 20 comprising the lateral walls is open at each of its two ends, the module also comprising two end walls 18A-18B independent of the piece and capable of closing the latter at its two open ends. The piece is tubular in shape and can be manufactured continuously. It can also be extruded. This further limits the manufacturing costs of the module. Alternatively, the piece can integrate one of the end walls of the envelope and be open only at one end to slide in the storage elements. The number of assembly steps is decreased but the piece is more complex to make, the envelope 16; 116 has a parallelepiped form, the piece 20 comprising four lateral walls. This configuration is in fact the optimal configuration in terms of bulk of the module, the or at least one of the contacting members 22; 80; 122 is configured to be able to deform elastically at least according to the direction normal to the contact faces. This elasticity is preferably inherent to the piece, due to its design or is present due to connected elements such as springs. Because of such a member, the distance between the contact faces is varied simply and efficaciously since this distance can have an infinite number of values. This therefore also takes into account the manufacturing tolerances of the elements of the module, in a particular embodiment, the or at least one of the contacting members 22 comprises a main wall 24 forming the first contact face 24A or the second contact face, and at least one tab 26 comprising an inclined arm 28 relative to the main wall and, at the end of the arm, a portion 30 forming the first or the second contact face 30A. This embodiment is advantageous as the elasticity is given by the form of the member which can therefore be made in a single piece, the or at least one of the contacting members 22 is configured to comprise a plurality of second contact faces 30A, each being intended to abut against a separate storage element 14, said element(s) being configured, especially being capable of deforming at least according to the direction normal to the contact faces, such that the distances between the first contact face 24A and each of the second contact faces 30A can be independent of each other. In a particularly advantageous embodiment, the or at least one of the contacting members 22 comprises a plurality of tabs 26, each tab being capable of being placed at right of a power storage element 14. In fact, in this case, the contacting member, which manages the pressing against the envelope of each of the storage elements individually and independent of the others, considers the slight differences in height between the elements, due to the manufacturing tolerances of the elements. This effect can also be achieved of course by means of other designs than those detailed here, for example if the member has second contact faces, which are not directly connected to each other and each connected to the first contact face by a spring, the or at least one of the contacting members 22 comprises means 34, 35 for holding said member 22 in a stressed position. This ensures better insertion of the member 22 into the envelope 16, without external intervention. The height of the member in its stressed position can in fact be selected such that there is a space between the member and the reference wall when the latter is inserted into the envelope and in contact with the corresponding storage element or storage elements. In a particular embodiment, the holding means comprise mechanical means 34, 35 such as one or more grooves, intended to cooperate with complementary means 70 attached to at least one storage element, to activate or deactivate the holding means 34, 35. The member is inserted with the elements and its stressed position can be activated or deactivated by cooperation with means 70 connected to the elements, which has it shift from an assembly position in which it has a first height and can easily be inserted in the envelope, to an operating position, in which it has a greater second height to be in contact with the wall of the envelope and the elements, the module comprises at least one electrically insulating element 36; 38, intended to be placed between the or at least one of the contacting members and the or at least one of the storage elements 14 and/or between the or at least one of the storage elements and a lateral wall of the envelope 16 opposite the reference wall. Preferably, such an element is placed above and below the module core. This or at least one of the electrically insulating elements can also be compressible, which regains the differences in height between the different storage elements. It is evident that this element is preferably also thermally conductive to enable proper transmission of heat to the envelope, the wall 120B of the envelope opposite the reference wall 120A is configured such that its distance relative to the reference wall varies locally. It can for example comprise undulations 121. The wall is configured such that the distance spread does not go over 1 cm, especially 5 mm. Such a configuration presses all the storage elements against the wall, even those of lesser height, without as such damaging the thermal mat 136 optionally placed between the wall and these elements to be compressed to better manage these clearances. In fact, when the wall 120B is not flat and an element 114 of considerable height is placed in the envelope, the thermal mat is highly compressed. When the distance varies between the reference wall 120A and the opposite wall 120B, there are areas (the areas farthest from the reference wall, which will not be in contact with the elements) which can leave space for the thermal mat 36 so that it deforms. Alternatively, the member can be configured to comprise recesses, especially having a slotted configuration to allow its deformation in these hollowed areas. This type of configuration is particularly adapted to cases where the contacting member does not adapt height adjustment of the contacting member on each element, the module comprises a single reference wall 20A, 120A constituted by the lower wall or the upper wall of the envelope 16, 116 constituting bigger discharge surfaces, which are in contact with all the elements. The module could nevertheless also comprise several reference walls or a reference wall which would be vertical once the module is out in place in its environment, the module comprises a shimming structure 50; 150 of at least two storage elements 14; 114, made of electrically insulating material, especially plastic, and comprising a plurality of housings 52 to receive at least one power storage element 14, 114. Such a structure 50, 150 wedges the elements relative to each other and insulates them electrically relative to each other. In the method according to the invention, since placement of the storage elements 14, 114 being carried out by sliding, such a structure is particularly advantageous, since it determines and keeps the relative position of the power storage elements prior to insertion of the elements in the envelope and therefore does away with an operator for carrying out complex adjustments blindly. In addition, such a structure offers a frame for automatically placing storage elements in the latter, the shimming structure 50 comprises at least one of the following means:
 cooperation means 70, 151 with the mechanical means 34, 35; 130 of the or of at least one of the contacting members,
 guide means 58 for cables 60, and/or
 means 56 for housing an electrical connection capable of cooperating with complementary connection means connected to the storage elements, and/or
 means 68 for housing an electrical connection on an electronic card, and/or
 mechanical fastening means 66 of the electronic card, and/or
 mechanical fastening means of at least one sensor.

The existence of the structure is used to further simplify the manufacturing method of the module by integrating functions on the latter. All connections are assembled especially on the structure prior to placing the elements on the latter, which prepares the structures outside the main mounting chain and further lowers costs of the manufacturing method of the module.

Another aim of the invention is an assembly method of a power storage module 10; 100 intended to contain a plurality of power storage elements 14; 114 in an envelope 16, comprising the steps of:
 insertion by sliding of at least one power storage element 14; 114 and a contacting member 22; 80; 122 comprising a first contact face 24A; 86A; 126A and a second 30A; 84A; 124A contact face and configured so that the distance between the first and second contact faces can vary, in a piece 20; 120 of the envelope 16; 116 having a closed outline and sized to enclose the power storage element, insertion being done such that the second contact face 30A; 84A; 124A of the member abuts against the or at least one of the elements and the distance between the contact faces is equal to a first distance,
 modification of the configuration of the contacting member 22; 80; 122 such that the distance between the first and second contact faces is equal to a second distance greater than the first and the first contact face 24A; 86A; 126A abuts against a wall, called reference 20A; 120A, of the piece of the envelope.

It is evident that the member and the storage elements can be inserted simultaneously or separately, as a function of the embodiments, into the envelope.

The method according to the invention can also comprise one or more of the characteristics listed hereinbelow:

the method comprises a connection step of said element(s) 14; 114 with the member 22; 122 prior the insertion step, insertion of elements and the member in the envelope being performed simultaneously the connection step is performed by cooperation of mechanical means 34, 35, 130 of the member with complementary means 70, 151 attached to the element and the modification step of configuration is performed by release of the cooperation between the mechanical means and the complementary means, the method comprises an insertion step of at least two storage elements 14; 114 in a shimming structure 50; 150 comprising a plurality of housings 52 respectively able to receive at least one of the storage elements, prior to the connection step of the storage element and of the contacting member. The mechanical means cooperating with the member can be placed on the shimming structure, the method comprises, prior the positioning step of the shimming structure, especially insertion of the elements 14 in the shimming structure 50, an assembly step of electronic connection elements, especially at least one cable 60, at least one electronic card, at least one connector, at least one sensor, on the shimming structure 50.

More particularly the module 10 shown in the figures will now be described.

Figure 1:
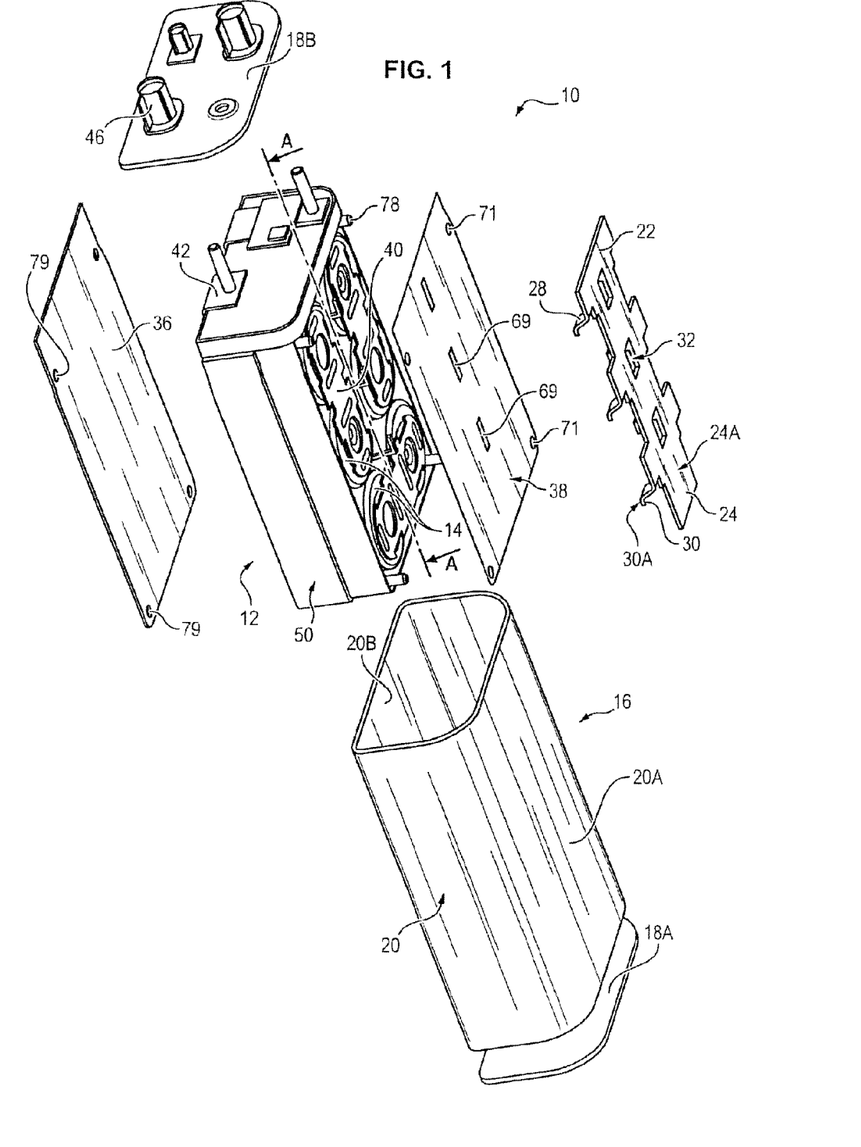
FIG. 1 is an exploded view of a power storage module according to an embodiment of the invention.

As is evident in FIG. 1, the module 10 comprises first of all a module core 12 comprising six power storage elements 14 which will be described in more detail hereinbelow.

It also comprises an envelope 16 of essentially parallelepiped form and comprising six walls. This envelope is made in three parts: a first end wall 18A, a second end wall 18B and a piece 20 comprising all the lateral walls of the module. This piece is tubular in form. It has a closed outline and is of course sized to receive the module core 12 and especially the elements and enclose the latter. The envelope is generally made of thermally conductive material, metallic material for example.

The module also comprises a contacting member 22 intended to insert between the upper wall 20A of the piece 20, also called reference wall, and the module core 12.

Figure 2:
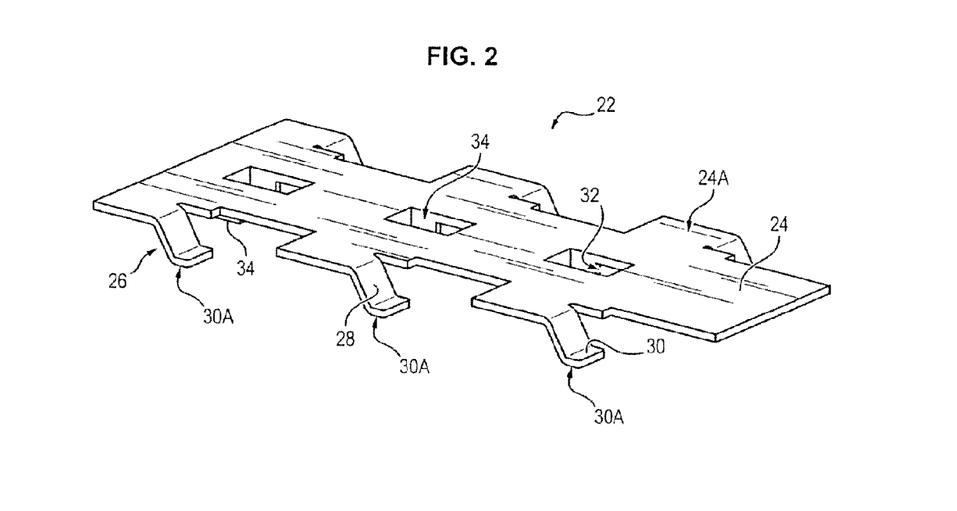
FIG. 2 is a view in perspective of a contacting member belonging to the module of FIG. 1.

As seen more clearly from FIG. 2, in which the member is shown in perspective, the latter comprises an overall flat main wall 24 whereof the upper face forms a first contact face 24A intended to abut against the upper wall 20A of the piece 20. The member 22 also comprises six tabs 26 projecting from the main wall and distributed over the member to each be opposite a power storage element 14 when the member 22 is put in place in the module. The member 22 comprises more particularly two rows of three tabs.

Each tab 26 comprises more particularly an inclined arm 28 relative to the main wall and, at the free end of the arm, an end wall 30 essentially parallel to the main wall and whereof the lower face forms a second contact face 30A intended to abut against one of the elements.

The member also comprises in a central part of the main wall, between the two rows of tabs, recesses 32. Material bridges 34 extend and project from the main around the recesses, on the same side of the main wall as the tabs. These material bridges connect three edges of each recess 32, two edges of which border the rows of tabs. They carry a blade 35 parallel to the main wall 24. The structure and the function of this blade 35 will be explained in more detail hereinbelow.

The member 22 is made of thermally conductive material for example metal such as steel or brass to transmit heat from the elements 14 to the envelope 16. It is configured such that the distance between the first and second contact faces can vary. In fact, due to the elasticity intrinsic to each tab, the position of the end wall 30 relative to the main wall 24 can vary as a function of external stresses on the tab 26.

The module also comprises a thermal mat 36 intended to be inserted between the lower end of the module core 12 and the lower wall 20B of the piece 20. This thermal mat is made of electrically insulating and thermally conductive material, such as EPDM (ethylene-polypropylene-diene monomer). This material is also elastically deformable. Heat can therefore be evacuated from the elements towards the wall 20B.

It also comprises an electrically insulating and thermally conductive insulation sheet 38 intended to be inserted between the upper face of the module core 12 and the contacting member 22. This sheet generally comprises recesses 69 which enable mechanical cooperation of the module core and of the member 22 by means of grooves 70 such as detailed hereinbelow as well as recesses 71 for positioning the sheet relative to the module core, cooperating with fingers 78 provided for this purpose on said core. These recesses are nevertheless not located at right of the elements to avoid any short-circuit between two elements 14, 114.

The current leaks which could occur from the module core as far as the envelope are minimised.

Figure 3:
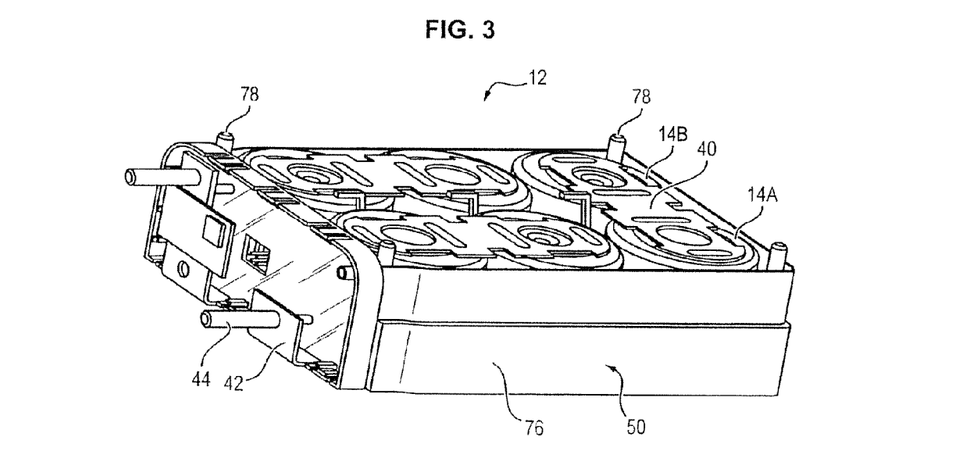
FIG. 3 is a view in perspective of a module core of the module of FIG. 1.

The module core 12 will now be described more specifically, by way of FIGS. 3 to 5. This module core comprises six power storage elements 14, each element conventionally having an essentially cylindrical form and comprising a tubular casing 14A with a base, this base forming a first electric terminal (for example a positive terminal) of the element, and a lid 14B, electrically insulated from the casing 14A, for example by an electrically insulating joint inserted between these two pieces. The lid forms a second electric terminal of the element, for example a negative terminal. It comprises an end wall and a cylindrical rim 15 partially covering the lateral wall of the casing 14A, the diameter of this rim 15 being greater than the diameter of the lateral wall 14A.

The elements 14 are connected electrically in series by means of connection links 40 made of electrically and thermally conductive material, especially metallic. These links 40 each connect a first terminal of a given element 14 to a second terminal of an adjacent element 14. Each element 14 is connected to a different element at each of its terminals. The module core 12 also comprises links 42 not connecting the element on which they are fixed (these are elements placed at the end of the series arrangement of the elements) to any other element. These links are connected by connectors 44 to the terminals 46 of the module, arranged here on the wall 18B of the envelope and shown in FIG. 1, and by which the module is connected to the external elements.

Figure 4:
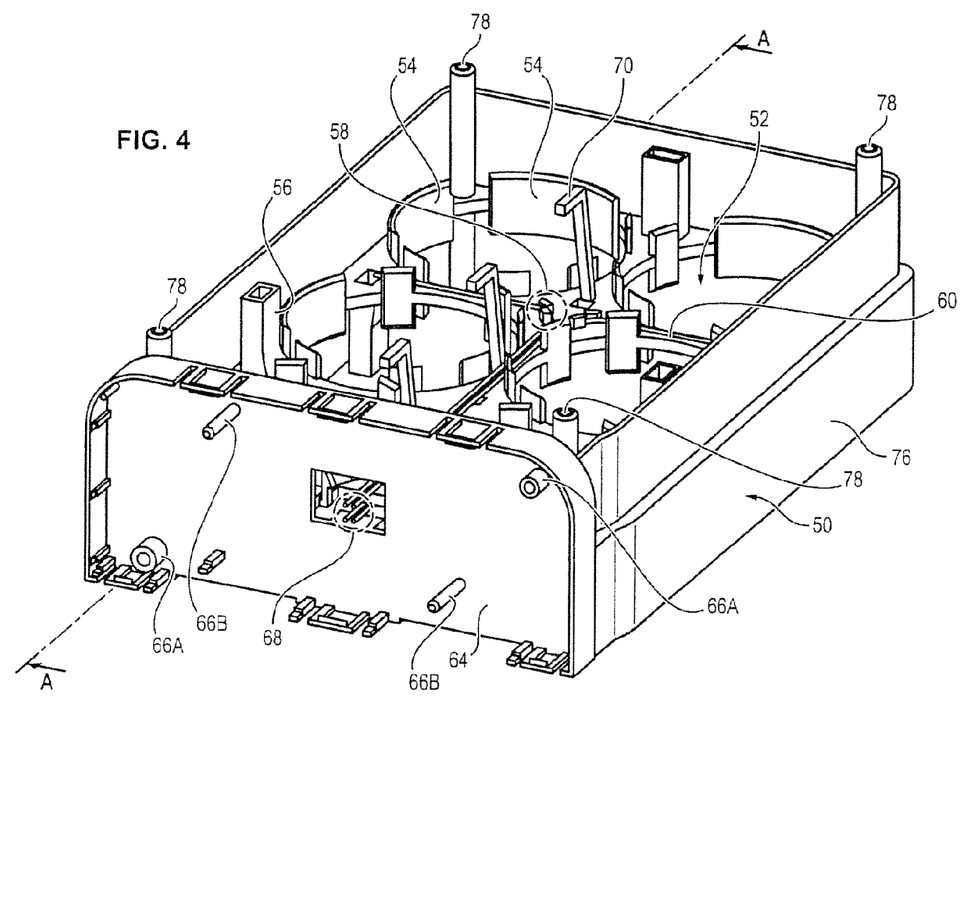
FIG. 4 is a view in perspective of a shimming structure of the module core of FIG. 1.

The module core 12 also comprises a shimming structure 50, clearer in FIG. 4. This shimming structure 50 is made of electrically insulating material, especially plastic material, by moulding, giving it a complex form and integrating many functions on this structure.

The structure 50 comprises a plurality of housings 52, each housing being sized to receive a power storage element 14. Each housing is also enclosed by a rim 54 intended to cooperate with a lateral wall of the casing 14A and a free end of the rim 15 of the lid 14B to execute centring and holding in position according to the axial direction of the element.

This shimming structure 50 also comprises recessed projections 56 located between the housings 52. These projections 56 are configured for holding in position an electric connector of female type (not visible), for example a lug of Faston® type. Such a connector cooperates with a complementary connector, of male type, connected to an electric terminal of a power storage element. In the embodiment described here, this complementary connector is a tab 57 arranged on the connection link 40, in a plane essentially perpendicular to the plane of the link and at the end face of the power storage elements 14. Since such a tab is not integral to the invention, it is not illustrated in the figures.

The shimming structure 50 also comprises cable guide means, comprising deformable pairs of tabs 58 between which the cables 60 can be inserted by clipping. These cables 60 are generally used in power storage modules to connect the elements 14 to an electronic card (seen in FIG. 1), capable of balancing the load of the different elements 14 of the module. They are especially connected to the connector placed in the projection 56 and on the electronic card at the other end, as will be described in detail hereinbelow.

The electronic card is intended to be positioned vertically, parallel to a support face 64 of the shimming structure, located at one end of the latter. The shimming structure 50 also comprises fastening means 66 of the electronic card, comprising two shanks 66A by means of which the electronic card can be screwed onto the structure 50 and two centring pins 66B enable positioning of said electronic card. This structure 50 also comprises a placement 68 for fixing an electric connector cooperating with the electronic card. This placement is here a recess made in the support face 64 opposite the placement provided for the connection on the electronic card. The connector intended to be placed in the recess 68 is connected to the cables 60 and plugged into the electronic card.

Figure 5:
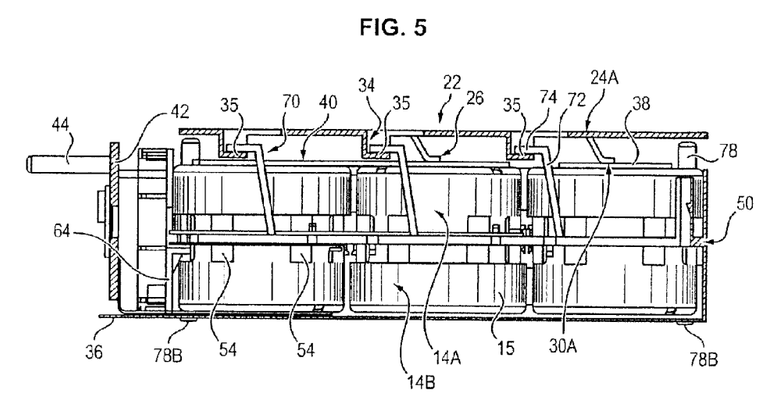
FIG. 5 is a side view, according to a section coupe A-A, of half of the module core and of the contacting member once premounted.

The shimming structure comprises also in the central part of grooves 70 in the form of a hook extending upwards and intended to cooperate with the blade 35 connected to the material bridges 34 of the member 22, to ensure premounting of the module core, as in FIG. 5. These grooves each comprise an essentially vertical arm 72 which extends upwards to exceed the elements once the latter are inserted into the shimming structure 50 and a rim 74 at its free end, essentially horizontal. As shown in FIG. 5, this rim 74 is intended to cooperate with the blade 35 forming a corresponding horizontal surface of the material bridge. Distribution of the material bridges 34 (distance, centring) therefore correspond to that of the grooves 70.

When the grooves 70 and the blade 35 cooperate, and are mechanically joined, the height of the member 22, specifically the distance between the first and second contact faces 24A-30A is predetermined as the member is crushed towards the shimming structure 50 under the action of the grooves 70. The height of the grooves 70 and of the blade 35 are selected so that the tabs 26 are in the stressed position.

Apart from the support face 64 intended to carry the electronic card, the shimming structure 50 also comprises lateral walls 76 extending over the entire height of the elements when the latter are inserted into the structure, and which border the structure on the three other sides to enclose them, consequently insulating the storage elements from the envelope 16.

The shimming structure 50 comprises also positioning means of the thermal mat 36, comprising four plots 78B respectively located at each corner of the shimming structure 50 and intended to cooperate with corresponding recesses 79 made respectively in the thermal mat 36. These plots 78B join the thermal mat 36 to the structure 50 to move them together. They also optionally join the structure 50 to an insulating sheet 38 if necessary.

The assembly method of the module such as described hereinabove will now be described.

During a first step, all the connections (cables 60, connectors, electronic card, etc.) are mounted on the shimming structure 50. Due to the presence of the shimming structure, this operation can in fact be performed before the elements are mounted on the structure and outside the main assembly chain, which gives consequent time gain.

The elements 14 are then inserted into the housings 52 of the shimming structure provided for this effect. As the elements 14 are intended to be connected in series by way of links, the elements are placed such that the second terminal (lid 14B) of a given element is located in the same plane as the first terminal (base of the casing 14A) of an adjacent element. As is seen from FIG. 5, the elements are therefore placed head to tail in the structure 50.

Next, once the elements 14 are positioned correctly, by means of the rims 54, the links 40, 42 are placed on the elements, on an end face of the elements 14 and these links are welded to the corresponding end faces of the elements 14. The core of the module 12 is then turned over and the same operation is repeated on the other side. A tab is then attached to each link such that the tab is inserted at its end in a Faston® lug 58 of the shimming structure. This connects the elements to the connections of the shimming structure. It is evident that the tab intended to be inserted in the Faston® lug can be made in a single piece with the link 40, 42.

The module core assembled in this way is then placed on the mat 36 and the sheet 38 of insulating material is also put in place on the upper face of the module core 12. These two pieces 36, 38 are positioned by means of studs 78, 78B of the structure 50. The member 22 is then put in place on the sheet 38. This member 22 is put in place such that the grooves 70 of the shimming structure cooperate with the blade 35 of the member. The height of the grooves 70 is selected so that the height of the resulting assembly is less than the available height inside the envelope 16, 116, especially of the piece 20, such that the assembly can easily be inserted in the envelope. The tabs 26 are each positioned at right of a power storage element 14 and are stressed, specifically crushed to be able to produce this configuration.

It is evident in this configuration that the position of the member 22 according to the longitudinal direction is offset relative to the shimming structure and that the member goes beyond the shimming structure at the level of its face opposite the support face 64.

The end face 18B is then mounted on the module core, such that the connectors 44 are correctly placed relative to the terminals 46 of the module borne by this wall 18B.

The end face 18A is also assembled in parallel on the piece 20 of the envelope 16.

Once these sub-assemblies are formed, the sub-assembly comprising the module core is slid into the piece 20 of the envelope by first inserting the face of the structure opposite the support face 64. In this way, the member 22 first makes contact with the end face 18A, before the structure 50, since it is offset relative to the latter. As the member 22 is held in a stressed position by the grooves 70 of the shimming structure 50, there is clearance between the upper face of the member and the lower face of the upper wall 20A of the envelope 16 and it is not difficult to slide the member 22 into the piece 20.

Once the member 22 is in contact with the end wall 18A, the module core continues to be pushed towards the wall 18A, until the end wall 18B is abutted against the corresponding end of the piece 20. During this step, the structure 50 therefore continues to slide as far as the wall 18A, while the member 22 remains static relative to this wall 18A. Since the member 22 is solid with the structure 50 by means of the grooves 70, the structure 50 is free to execute translation relative to the member 22 towards the wall 18A, the grooves 70 not holding the member 22 in this direction.

In this way, the grooves 70 execute translation relative to the blades 35 of the member until disengaging completely from the blades 35. The member and especially the tabs 26 are therefore no longer stressed by the grooves 70, once the module has reached its final configuration. The tabs 26 regain their initial position free of stress and the distance between the contact faces 24A and 30A grows until the main wall 24 of the member 22 comes into contact with the upper wall 20A of the envelope.

It is evident that it is particularly advantageous for the member 22 to comprise a plurality of tabs 26 independent of each other. In fact, the latter can be more or less stressed as a function of the element 14 opposite which they are located and regain the existing variations in height at the level of the elements (manufacturing tolerances).

Once the module core is inserted into the envelope, it remains only to fix the end wall 18B to the piece 20 to obtain the finished module. Tightness between these different elements is ensured by means of elastic joints placed at the interface of the piece 20 and the end walls 18A, 18B or overmoulded onto one or the other of these elements.

The finished module allows better diffusion of heat than solutions known from the prior art, since heat is diffused via two separate ways: by means of the thermal mat 36 and the lower wall 20B on the one hand and by means of the member 22 and of the upper wall 20A on the other hand. Heat is therefore evacuated more rapidly towards the envelope 16 of the module. Also, as the envelope 16 has closed outline made in a single piece 20, heat is diffused easily (no interface) to the vertical lateral walls from the upper wall and/or the lower wall of the module. The heat is best distributed in the module and exchange surface with air or other elements of the environment of the module (here, for example a chassis of the vehicle, placed in contact with the lower wall of the module) is therefore larger. This also improves discharge of heat.

Figure 6:
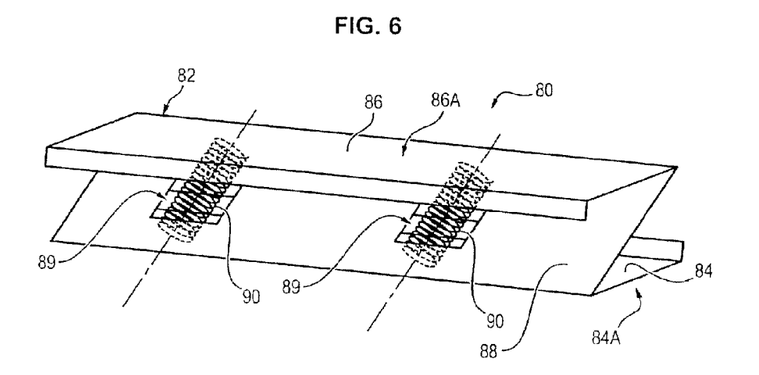
FIG. 6 is a view in perspective of a contacting member according to a second embodiment of the invention.

In reference to FIGS. 6 and 7 a variant of the embodiment described previously will now be described. In this embodiment, longitudinal members 80 (acting as contacting members) are inserted into the piece 20 in place of the member 22 comprising the tabs 26. These longitudinal members also extend essentially according to the entire longitudinal dimension of the envelope and are made of metal. The longitudinal members 80 are each placed at right of a row of three storage elements 14.

As can be seen, each longitudinal member 80 comprises a Z-shaped profile 82, having a support wall 84 (lower in the present case) on a plurality of elements and a support wall 86 (upper in the present case) on the reference wall 20A. These two walls 84, 86 are connected by a diagonal wall 88, which lets the profile acquire a certain elasticity in the direction normal to the walls 84, 86 (also normal to the walls 20A, 20B when the longitudinal member 80 is placed in the piece 20) since the height of the profile can be modified according to the inclination of the diagonal wall, as is also seen between the positions shown in full lines and in dotted lines in FIG. 7. The support walls 84, 86 respectively define the first and second contact faces 84A, 86A. Due to the configuration of the longitudinal member, the distance between these walls and contact faces is variable.

The profile 82 also comprises in its diagonal wall 88 a plurality of openings 89 distributed symmetrically and uniformly over the entire length of the profile.

In each of the openings 89 a spring 90 whereof a first end is connected to (rests on) the upper wall 86 of the profile and a second end is connected to (rests on) the lower wall 84 of the latter is put into place.

Figure 7:
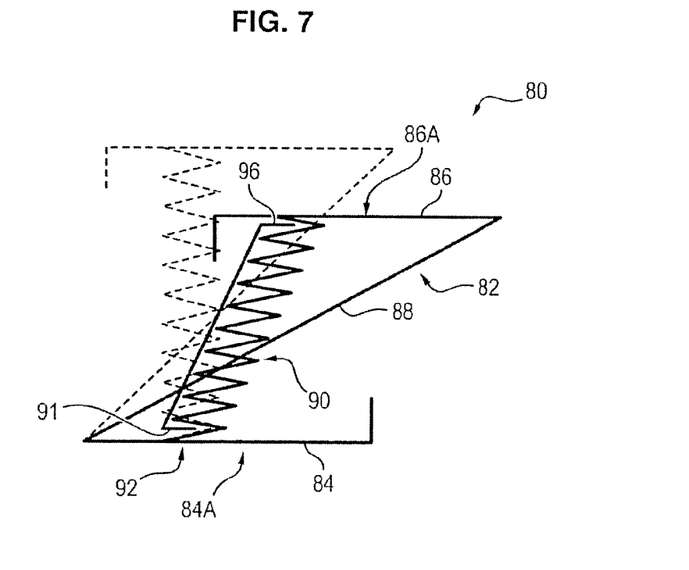
FIG. 7 is a view in transversal section of the member of FIG. 6, in an assembly configuration (in solid lines) and an operating configuration (in dots)

The spring 90 is held in a stressed position in compression, that is, its length is less than its length at rest by pliers 92 comprising two branches 94, 96 attached respectively to the ends of the spring and having a predetermined length (corresponding to the length of the spring 90 in the stressed state and therefore less than the length at rest of the spring), seen in FIG. 7. Alternatively the holding means could comprise one or more vertical tabs connecting the walls 84, 86 of the longitudinal member 80, such a tab being breakable.

When a longitudinal member 80 is inserted into in the piece 20, simultaneously or not on the module core 12, the springs 90 are in a stressed position by means of pliers 92, constituting the assembly position of the module, shown in solid lines in FIG. 7. The longitudinal members are inserted easily into the piece since the distance between the walls 84, 86 is selected so that there is clearance between the upper face 86A of the support wall 86 and the lower face of the reference wall 20A of the envelope. Next, the pliers 92 are removed so that the springs 90 tend to regain their length at rest, effectively increasing the height of each longitudinal member 80 such that the latter abuts against the upper wall 20A of the envelope. The corresponding configuration of the longitudinal member 80 is shown in dotted lines in FIG. 7.

Such a longitudinal member presses the elements 14 against the thermal dissipation wall 20B of the module, irrespective of the manufacturing tolerances of the different elements (piece 20, elements 14). However, in this case, no consideration is given at the level of the longitudinal member of the dispersion of dimensions of the elements since a single longitudinal member rests on 3 separate elements.

It is clear that the length at rest of the springs is selected such that the longitudinal members 80 stressed in extension by the springs 90 can press the elements 14 against the dissipation wall 20B even if the elements 14 have the minimal size and the piece 20 has its maximal size, given manufacturing clearances. The length at rest of the springs 90 is especially greater than its length when the longitudinal member 80 is in an operating configuration.

It is also clear that the pliers 92 keeping the springs 90 in a stressed position could, as shown in the previous embodiment, cooperate with an element connected to one or more elements 14, especially of the plastic structure 50, to be deactivated automatically during assembly. A point attached to the plastic structure 50 (for example at the end of a groove such as the groove 70) could percuss each pliers 92 in a weakness area of the latter when the plastic structure abuts against the wall 18A of the envelope 16 to break or unclamp each pliers 92.

Figure 8A:
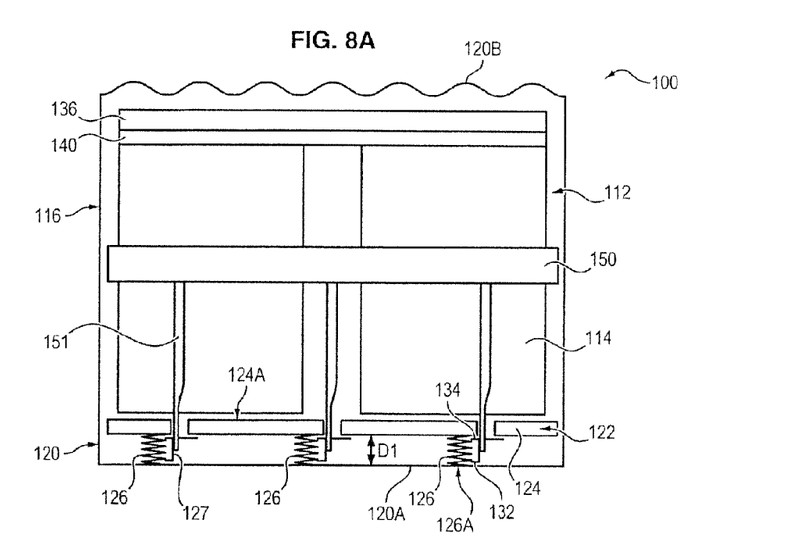
FIGS. 8A and 8B are side views of a module according to a third embodiment of the invention, at different steps of the assembly method of the module.
Figure 8B:
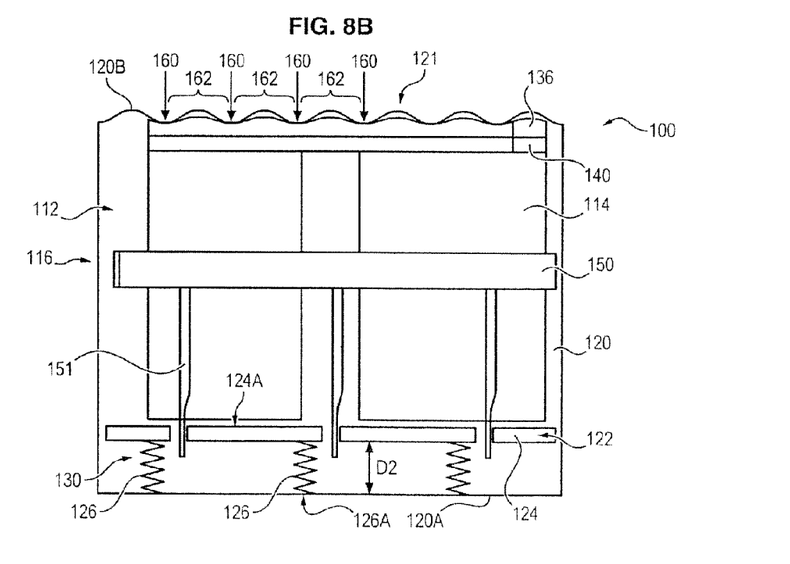

Yet another embodiment of a module according to the invention has been shown in FIGS. 8A and 8B. These figures show a module 100 in section during assembly of the module core 112 in the piece 120 then the module after insertion of the module core into the piece 120.

FIG. 8A shows the piece 120 in section, into which a contacting member 122 has been inserted. This member 122, this time located under the module core, comprises a main wall 124 essentially flat and parallel to the reference wall (here the lower wall of the piece) and in a single piece with a plurality of springs 126 prestressed by pliers 127 holding it in compression, these springs 126 being located between the main wall 124 of the member and the reference wall 120A of the module, corresponding to the lower wall of the piece 120. The upper face 124A of the main wall 124 form a contact face 124A intended to be in contact with the elements 114, while the lower ends of the different springs 126 form another contact face 126A intended to be in contact with the reference wall 120A of the envelope. Due to the presence of the springs 126, the distance between the contact faces 124A, 126A is of course variable.

The pliers 127 hold the springs 126 in compression, between two branches 132, 134, at a length less than their resting length, as explained earlier. For better holding of each spring 126, the branches 132, 134 of the pliers 127 can be shaped like a fork, the spring being placed between two tines of the latter. The whole is shaped such that the height of the member 122 in prestressed configuration and surmounted by the module core is less than the height available inside the piece 120.

Figure 9:
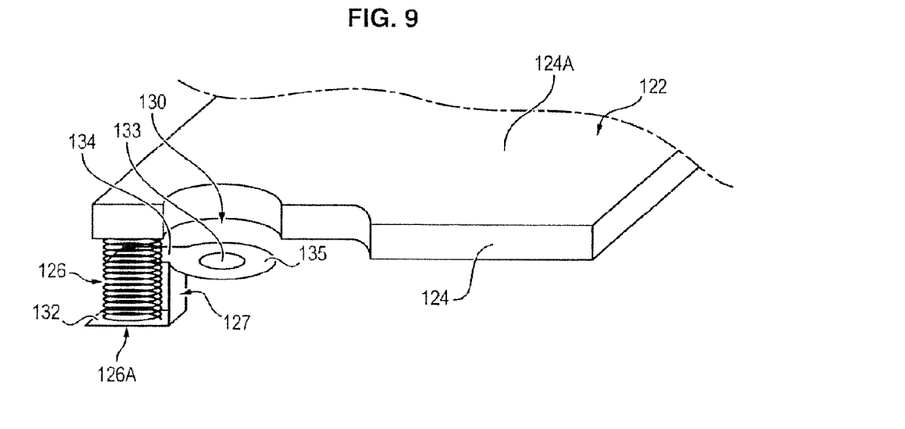
FIG. 9 is a sectional view in perspective of a detail of the module of FIGS. 8A and 8B.

Placed on the main wall 124 is the module core comprising the elements 114, connected by connecting links 140, and covered by the thermal mat 136, the elements also being contained in the shimming structure 150. As is evident, the shimming structure comprises positioning shanks 151 inserted in orifices 130 of the holding wall, specifically the main wall 124 of the contacting member 122. These shanks also enter an orifice 133 of the pliers 127 situated on an extra arm 135 of the latter, in the extension of the upper branch 134 but not acting to clamp the springs, as seen more clearly in FIG. 9, which is a sectional view in perspective of the detail of the arrangement of the holding wall 124 of pliers 127 and a spring at the level of orifices 130, 133.

Next, as seen in FIG. 8B, the structure is pushed towards the right end (in the figure) of the module (the contacting member 122 in this case already being out in place in the module). The shanks 151 are therefore pushed towards the right end of the orifice 130 and pull the pliers 127 along with them (due to their insertion in the orifice 133). This releases the springs 126 which, because of their prestressed position, tend to elongate, covering the distance between the reference wall 120A and the main wall 124 by a distance D1 (in FIG. 8A) at a distance D2 greater than the distance D1 (in FIG. 8B). This distance D2 is the distance for which the elements 114 are in thermal contact, more particularly the thermal mat 136 is in contact, with the thermal dissipation wall 120B, as seen in FIG. 8B.

As also seen in FIGS. 8A and 8B, this thermal dissipation wall 120B can be undulated, as opposed to the thermal dissipation wall 20B of the first embodiment. These undulations 121 extend over the entire longitudinal dimension of the piece 120 and are sufficiently close so that the thermal mat 136 at right of each element 114 is capable of being in contact with the wall 120B in several places. These undulations 121 preferably have a height which does not exceed 1 cm to avoid increasing the volume of the module. Their spread is especially less than 2 cm. Their presence on the upper wall is provided so as not to damage the thermal mat 136.

In fact, as a function of the manufacturing tolerances of the piece 120, and the elements 114 especially, the distance to be attained so that the elements 114 are in thermal contact with the wall 120B is not always the same and the thermal mat 136 is therefore not always compressed in the same way. Here, the mat 136 is in close contact with the upper wall at the level of the sites 160 of the wall 120B closest to the wall 120A, irrespective of the manufacturing tolerances of the different elements. However, when the mat 136 must be highly compressed, it is likely to be damaged if its compressibility limit is exceeded. This phenomenon is avoided by arranging areas 162, between the contact sites 160, in which the thermal mat 136 is not so compressed and can even "dampen" the compression undergone at the level of the contact sites.

It is evident that the above embodiments do not describe the invention in a limiting way. The latter can have many variants relative to what has been described, all within the scope of the claims. For example:

- the reference wall can be any wall of the piece 20. The piece can also comprise several reference walls; the piece can for example comprise two overall orthogonal reference walls, to press the module in the corner opposite the envelope,
- the module can be not parallelepiped,
- the form of the thermal dissipation wall is not limited to what is described. Also, to fulfil the same function as that fulfilled by the undulations, the thermal mat can be hollowed out by areas. It is noted that configuring the thermal dissipation wall such that it has local variations in height seems unnecessary when the contacting member comprises independent elastic means for adjusting the distance between the first contact face and the second contact face at right of each element,
- the lateral walls are not necessarily in a single piece,
- the piece of the envelope can comprise one of the end walls,
- the contacting member is in a single piece with a lateral wall of the envelope or the shimming structure,
- the number of contacting members can be different to what has been described. The module could for example comprise a contacting member specific to each element,
- the contacting member can be made partially of thermally insulating material,
- the form of the contacting members (section, etc.) is not limited to what is described,
- a thermal mat can be introduced as replacement or supplement to the insulating sheet 38 between the holding wall 24 and the elements 14. The module may also not comprise a thermal mat and/or an insulating sheet (if the contacting member is not made of material electrically conductive) and/or the envelope is made of electrically insulating material and not metal,
- the shimming structure is optional. Its form and the functions which it integrates are not limited to what has been described.

Similarly, as for the assembly method, the steps can vary as a function of the elements present or not in the module. Neither is the order of the steps limited to the above. For example, in terms of a module such as that of FIG. 1, the end wall 18B could be fixed to the module core on completion of assembly, just before it is affixed to the piece 20, or before the electronic card is affixed to the structure. The way of removing the pliers or the holding means can also be different to what has been described hereinabove.

The invention claimed is:

1. A power storage module capable of containing a plurality of power storage elements, the module comprising:
   an envelope comprising at least a plurality of lateral walls and two end walls sized to enclose the power storage elements, at least one contacting member placed between at least one power storage element and a lateral wall of the module, called reference wall, said contacting member comprising a first physical contact face and a second physical contact face associated respectively to the reference wall and said power storage element(s), said first physical contact face being adapted to abut against the reference wall and said second physical contact face being adapted to abut against said power storage element(s), and said contacting member being configured such that the distance between the first and second physical contact faces can vary, wherein the contacting member is made of thermally conductive material, and wherein the contacting member comprises mechanical means and the storage elements being provided with complementary means cooperating with the mechanical means, the mechanical means and the complementary means being configured such that said variation of distance between the first and second physical contact faces of the contacting member is operated automatically, during insertion of the power storage elements in the envelope, by release of cooperation between the mechanical means and the complementary means.

2. The power storage module according to claim 1, wherein said member comprises a first contact face, a second contact face and at least one elastically deformable component between the first contact face and the second contact face, the reference wall and said element(s) being adapted to stress respectively the first contact face and the second contact face such that the distance between the first contact face and the second contact face varies by deformation of the elastically deformable component.

3. The power storage module according to claim 1, wherein the lateral walls of the envelope are made in a single piece having a closed outline and being sized to enclose the power storage elements.

4. The module according to claim 3, wherein the piece also comprises an end wall in a single piece with the lateral walls.

5. The module according to claim 3, wherein the piece comprising the lateral walls is open at its two ends, the module further comprising two end walls, each wall being independent respectively of the piece and capable of closing the latter at an open end.

6. The module according to claim 1, wherein the or at least one of the contacting members is configured to comprise a plurality of second contact faces, each being intended to abut against a separate storage element, said at least one member being configured such that the distances between the first contact face and each of the second contact faces can be independent of each other.

7. The module according to claim 1, wherein the or at least one of the contacting members is configured to be able to deform elastically at least in the normal direction to the contact faces.

8. The module according to claim 1, wherein the or at least one of the contacting members comprises a main wall forming the first or the second contact face, and at least one tab comprising an arm inclined relative to the main wall and, at the end of the arm, a portion forming the second or the first contact face.

9. The module according to claim 8, wherein at least one of the contacting members is configured to comprise a plurality of second contact faces, each being intended to abut against a separate storage element, said at least one member being configured such that the distances between the first contact face and each of the second contact faces can be independent of each other, and wherein the at least one contacting member comprises a plurality of said tabs, each tab being adapted to be placed at right of a power storage element.

10. The module according to claim 1, wherein the or at least one of the contacting members comprises holding means for holding said member in a stressed position.

11. The module according to claim 10, wherein the holding means comprise mechanical means, such as one or more blades or pliers, intended to cooperate with complementary means attached to at least one storage element to activate or deactivate the holding means.

12. The module according to claim 1, comprising at least one element electrically insulating, intended to be placed between the or at least one of the contacting members and the or at least one of the storage elements and/or between the or at least one of the storage elements and a lateral wall of the envelope opposite the reference wall.

13. The module according to claim 1, comprising a single reference wall constituted by the lower wall or the upper wall of the envelope.

14. The module according to claim 1, comprising a shimming structure of at least two storage elements, made of electrically insulating material and comprising a plurality of housings each intended to receive one or more power storage elements.

15. The module according to claim 14, wherein the shimming structure comprises at least one of the following means:
- cooperation means with the mechanical means of the or of at least one of the contacting members,
- guide means of cables, and/or
- means for housing an electric connector capable of cooperating with complementary means connected to the elements, and/or
- means for housing a connector on an electronic card, and/or
- means for fastening the electronic card, and/or fastening means of at least one sensor.

16. An assembly method of a power storage module intended to contain a plurality of power storage elements in an envelope comprising at least a plurality of lateral walls and two end walls, comprising the following steps:
- insertion by sliding of at least one power storage element and one contacting member comprising a first contact face and a second contact face and configured so that the distance between the first and second contact faces can vary, in a piece of the envelope having a closed outline and sized to enclose the power storage element, said insertion being done such that the second contact face of the member abuts against the or at least one of the power storage elements and the distance between the contact faces is equal to a first distance,
- modification of the configuration of the contacting member such that a first distance between the first and second contact faces is equal to a second distance greater than the first distance and the first contact face abuts against a wall, called reference, of the piece of the envelope, wherein said contacting member is made of a thermally conductive material, and wherein the method comprises a connection step of said power storage element(s) with the contacting member prior to the insertion step, this connection step being completed by cooperation of mechanical means of the contacting member with complementary means attached to the power storage element and the modification step of the configuration being effected by release of cooperation between the mechanical means and the complementary means.

17. The method according to claim 16, comprising an insertion step of at least two storage elements in a shimming structure comprising a plurality of housings adapted respectively to receive at least one of the storage elements, prior to the insertion and/or connection step of the storage element and of the contacting member.

18. The power storage module according to claim 1, wherein said module comprises a shimming structure of at least two storage elements, comprising a plurality of housings, each intended to receive one or more power storage elements, said shimming structure being provided with the complementary means, the variation of distance between the first and second physical contact faces of the contacting member being operated automatically during insertion of the power storage elements in the envelope, by the relative movement of the contacting member and of the shimming structure.

* * * * *